United States Patent
Beggs et al.

(10) Patent No.: US 6,799,187 B2
(45) Date of Patent: Sep. 28, 2004

(54) OPPORTUNISTIC PARTS MARKING MANAGEMENT SYSTEM

(75) Inventors: Robert M. Beggs, West Chester, PA (US); Bradley J. Buchanan, Morton, PA (US); Allan Bucknell, Philadelphia, PA (US); Martin Eldridge, Martock (GB); Mike Woogerd, Seattle, WA (US); Ron Carson, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 361 days.

(21) Appl. No.: 10/033,699

(22) Filed: Dec. 26, 2001

(65) Prior Publication Data

US 2003/0120416 A1 Jun. 26, 2003

(51) Int. Cl.$^7$ ................................................. G06F 7/00
(52) U.S. Cl. ........................ 707/104.1; 707/1; 707/10
(58) Field of Search ................... 707/1–10, 100–104.1, 707/200–203; 705/22–24, 28–29, 36–37; 156/1, 60, 277; 219/50, 121.11, 121.6, 121.67, 121.68, 121.83; 257/E23.176, E23.179; 493/51, 186–187, 189, 199, 200–202, 231, 227, 264, 332, 328, 331; 209/12.1, 44.1, 509, 522, 546, 606, 702; 711/100, 141, 117–118, 143

(56) References Cited

U.S. PATENT DOCUMENTS

| | | | | |
|---|---|---|---|---|
| 4,408,215 A | * | 10/1983 | Kitchen ........................ 347/166 |
| 4,578,636 A | * | 3/1986 | Bakke et al. .................. 324/66 |
| 4,594,263 A | * | 6/1986 | Folk et al. ................... 427/554 |
| 5,379,887 A | * | 1/1995 | Conley, Jr. ................... 206/232 |
| 5,406,042 A | * | 4/1995 | Engelfriet et al. ...... 219/121.68 |
| 5,547,501 A | * | 8/1996 | Maruyama et al. ....... 106/31.14 |
| 5,670,825 A | * | 9/1997 | Hyde et al. .................. 257/730 |
| 5,790,047 A | * | 8/1998 | Golan ....................... 340/10.42 |
| 5,824,715 A | * | 10/1998 | Hayashihara et al. ......... 522/14 |
| 6,132,818 A | * | 10/2000 | Tanaka et al. ............... 427/596 |
| 6,347,319 B1 | * | 2/2002 | Moore ......................... 707/101 |
| 6,365,995 B1 | * | 4/2002 | Fukuda et al. ................ 310/81 |
| 6,394,800 B1 | * | 5/2002 | Rohlcke et al. ............... 433/23 |
| 6,452,298 B1 | * | 9/2002 | Fukuda et al. ................ 310/89 |
| 6,476,351 B1 | * | 11/2002 | Kaplan et al. .......... 219/121.69 |
| 6,538,623 B1 | * | 3/2003 | Parnian et al. .................. 345/8 |
| 6,585,927 B2 | * | 7/2003 | Grigg et al. ................. 264/401 |
| 6,635,333 B2 | * | 10/2003 | Grigg et al. ................. 428/134 |
| 6,697,812 B1 | * | 2/2004 | Martin ........................ 707/100 |
| 6,706,374 B2 | * | 3/2004 | Grigg et al. ................. 428/199 |

* cited by examiner

*Primary Examiner*—Greta Robinson
*Assistant Examiner*—Linh Black
(74) *Attorney, Agent, or Firm*—Black Lowe & Graham PLLC; Mark S. Beaufait (57) ABSTRACT

A system, method, and computer program product are provided for marking equipment parts. The system consists of electronic parts marking instruction cards, databases, and, in many applications, remote parts marking equipment. The system also includes analysis and monitoring components for monitoring parts marking programs, including opportunistic parts marking programs. The computer product described utilizes electronic parts marking instruction cards, and allows multiple users at multiple locations to mark parts for complex equipment as they are being operated and maintained.

30 Claims, 12 Drawing Sheets

View Mode Search Results (Management Demo) - Microsoft Internet Explorer

% Option Explicit %>

DPM MANAGEMENT DEMO

[ Back ]  [ Main Menu ]

Parts — 390

| Line | CAGE | Part Number | Description | Serial Number | Location |
|---|---|---|---|---|---|
| 1 | 77272 | 145D5518-6 | Xmsn Oil Cooler Fan Assembly | 00000000000010011 | HUNTSVILLE |
| 2 | 77272 | 145D5517-6 | Xmsn Oil Cooler Fan Assembly | 00000000000010013 | HUNTSVILLE |
| 3 | 77272 | 145D5514-6 | Xmsn Oil Cooler Fan Assembly | 231 | HUNTSVILLE |
| 4 | 77272 | 145S4906-75 | Clam Shell Doors (LH) | 00000000000009997 | HUNTSVILLE |
| 5 | 77272 | 145S4906-75 | Clam Shell Doors (LH) | 21 | CCAD |
| 6 | 77272 | 145D6300-3 | Engine Transmission | 00000000000009999 | HUNTSVILLE |
| 7 | 77272 | 145S2905-243 | Tunnel Cover Doors | 00000000000010008 | HUNTSVILLE |
| 8 | 77272 | 145C3171-3 | Bellcrank Assembly | 00000000000009996 | PHILADELPHIA |

8 tasks found
Enter new search criteria

*FIG.12*

OPPORTUNISTIC PARTS MARKING MANAGEMENT SYSTEM

FIELD OF THE INVENTION

This invention relates generally to parts marking and management systems, and, more specifically, to a method and system for opportunistic parts marking and management in fielded equipment.

BACKGROUND OF THE INVENTION

Operation and maintenance of equipment placed in the field, including aircraft or vehicles, may be managed more efficiently and reliably when component parts are marked and tracked. Historically parts marking took place only when equipment was initially manufactured. Marking of unmarked components on older fleets of fielded equipment, such as aircraft or vehicles, poses difficult technical and management challenges and to date has not been substantially cost effective or feasible. Existing systems involving human readable labels or marks and manual data entry systems often incorrectly interpret up to one out of 30 characters when data is transposed during day-to-day maintenance tasks. Human readable marking systems and manual data entry systems thus seriously undermine the benefits of parts and equipment configuration and asset management, even when the data itself is maintained digitally. Statistically, manual parts data capture procedures during aircraft pre-maintenance auditing is likely to induce as many data anomalies as the process is designed to prevent.

Equipment such as vehicles and aircraft are often operated in remote locations, where prior systems have not allowed interaction with a digital maintenance management systems. Such remote access would allow great flexibility in parts marking and management strategies. These include opportunistic parts marking and management wherever it is convenient to gain access to parts on the equipment, in transit, or as available in a storage facility. Remote marking and sampling of parts also allows implementation of wide ranging "seek and mark" strategies to mark particular parts held within a domain. Alternately, "gateways" can be established to register parts transiting a supply chain either rejecting unmarked parts, or marking unmarked parts. Remote marking and management would also allow "use-based" marking immediately prior to use, at local forward supply and maintenance locations.

Standardized marking procedures, implemented at all operating and maintenance locations on fielded equipment, have not previously been feasible. Standardized computer based marking would permit remote marking and parts management, as well as uniform marking during "equipment build," when complicated equipment, such as vehicles or aircraft, are initially manufactured, or subject to re-manufacture and/or major modification.

Prior marking systems have also been time consuming and labor intensive to use, making parts marking and management often cost prohibitive. A portable, systemized, and standardized computer based parts marking system would permit parts marking and management to occur more efficiently and inexpensively. Such a system would provide electronic engineering record card data for all installed components with operational lifetimes, and such information would be available to all users.

Prior systems, due to being error prone and inefficient, also have faced major lead-time lags in marking and management. As a result, prior systems have not generated instantaneous or contemporaneous snapshots of fleet parts configurations. Such information would open numerous opportunities for process improvements in fleet planning, fleet management, trend analysis, and problem resolution, while maintaining and operating fleets of complex equipment.

Therefore, a need exists for a parts marking and management system which can manage parts marking process development, user authorization, data publication to users, enable authorized marking to be carried out by multiple teams in remote locations, deliver part number and serial number configuration control processes to multiple remote locations, create accurate machine readable labels, and track progress of multiple marking operations against marking program and management goals.

SUMMARY OF THE INVENTION

A system, method, and computer program product for an opportunistic parts marking management system are provided. The parts marking management system of the present invention includes a networked parts database including electronic parts marking cards (electronic task cards) with instructions for standardized marking of critical components, a database for authorizing and validating electronic parts marking card entry and quality control, a serial number/part number database, a serial number/part record generator, and a status tracking database, all network accessible. Linked via network to the database(s) are remote scanners and mark or label generators utilized for parts marking, and parts tracking, at either local or remote locations. Electronic record cards for individual parts are maintained in the parts database. Status of the marking program, and of the parts themselves as needed, whether in storage, transit, or fielded in equipment, is tracked through the status-tracking database. The status-tracking database is available to managers via network connections, who may use the system to output status and completion metrics for system operation and improvement.

The present invention makes it possible to provide for cradle-to-grave equipment parts marking and tracking support for complex equipment, in remote locations, and on an as-needed and as-available basis, even for equipment and parts that have not been previously marked.

The present invention accommodates a wide variety of parts marking methodologies and data types. The system utilizes computer scanners to eliminate human data transposing errors and labeling errors. Adoption of the system allows unique serialization of individual components. Use of a local area network wireless network, or a computer network, such as the World Wide Web, permits operation of different steps of the method in divergent locations. The program system linked to the databases and marking and scanning equipment via the network provides an opportunity for parts marking, quality control, parts monitoring, and parts management, all in one operation.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a computer network-based system to enable parts marking implementation, efficiency, coordination, and program control. The present invention enables unique serialization of components being marked across disparate geographic locations. The present invention greatly assists in parts management for fielded fleets of airplanes, motor vehicles, and any other devices or equipment that require ongoing parts maintenance and replacement.

Figure 1:
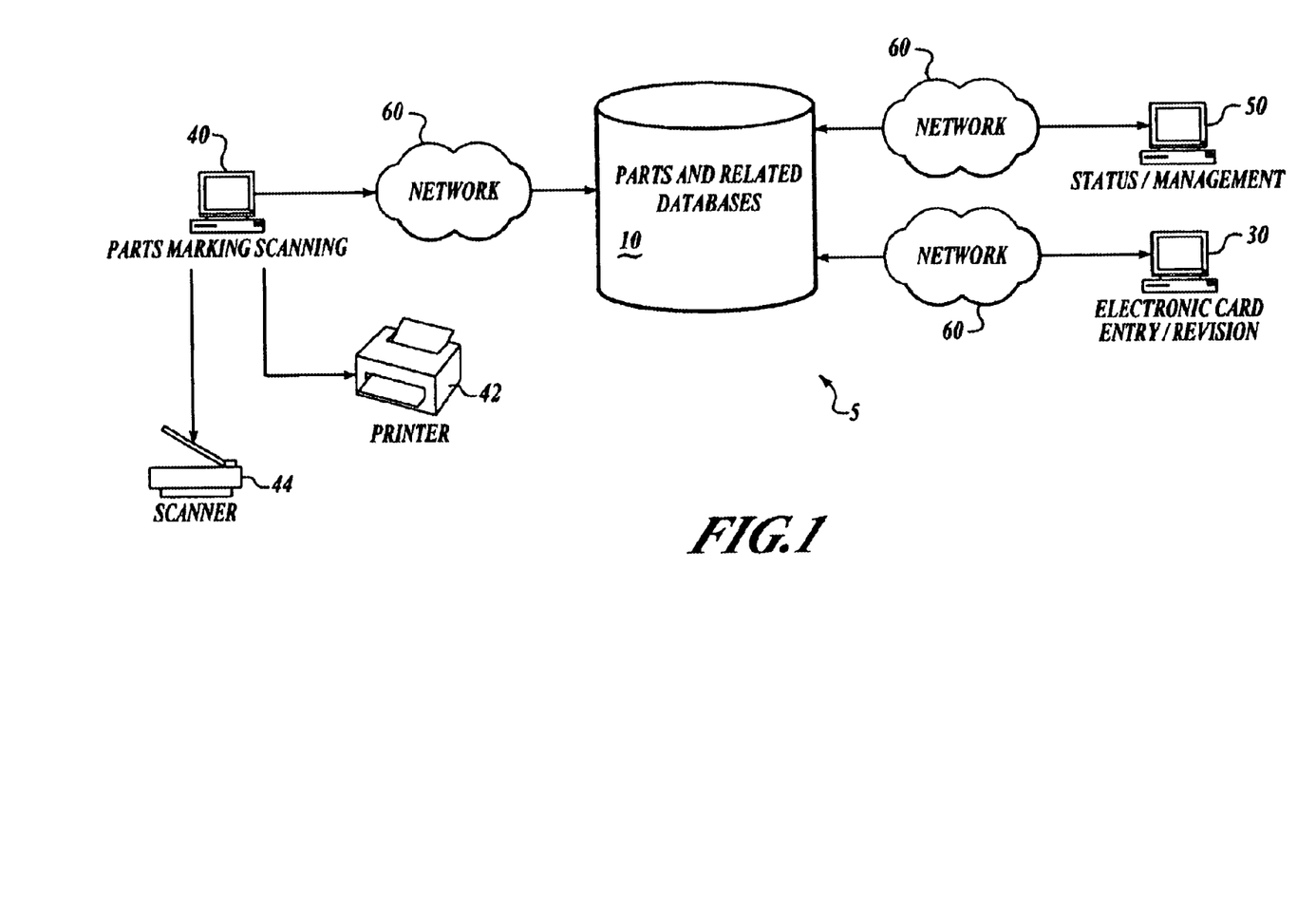
FIG. 1 is a symbolic diagram of an example system of the opportunistic parts marking management system and its components.

FIG. 1 illustrates an example system of a network-based opportunistic parts marking management system 5 implementing the present invention. The system 5 includes one or more databases 10 coupled to a parts marking and scanning subsystem 40, a status/management subsystem 50, and an electronic card entry/revision subsystem 30 over a network 60. The databases 10 are preferably supported on a processor-based server. The parts marking and scanning subsystem 40, status/management subsystem 50, and electronic card entry/revision subsystem 30 are preferably processor-based systems. In other configurations of the invention, the databases, parts marking and scanning, status/management, and electronic card entry/revision subsystems may be variously distributed and/or combined in different locations and in different processor based systems. The network utilized may be a direct connection or wireless network, and may be a public or private local area network, or a wide area network. In one presently preferred embodiment of the invention, the network utilized is a diffuse computer network, such as the World Wide Web.

The parts marking and scanning subsystem 40 includes a bar code scanner 44, or similar scanner, often handheld, and a marking device 42, here a label printer. Alternative marking devices and methods are well known and are discussed in more detail below, under block 160 of FIG. 3.

Figure 2:
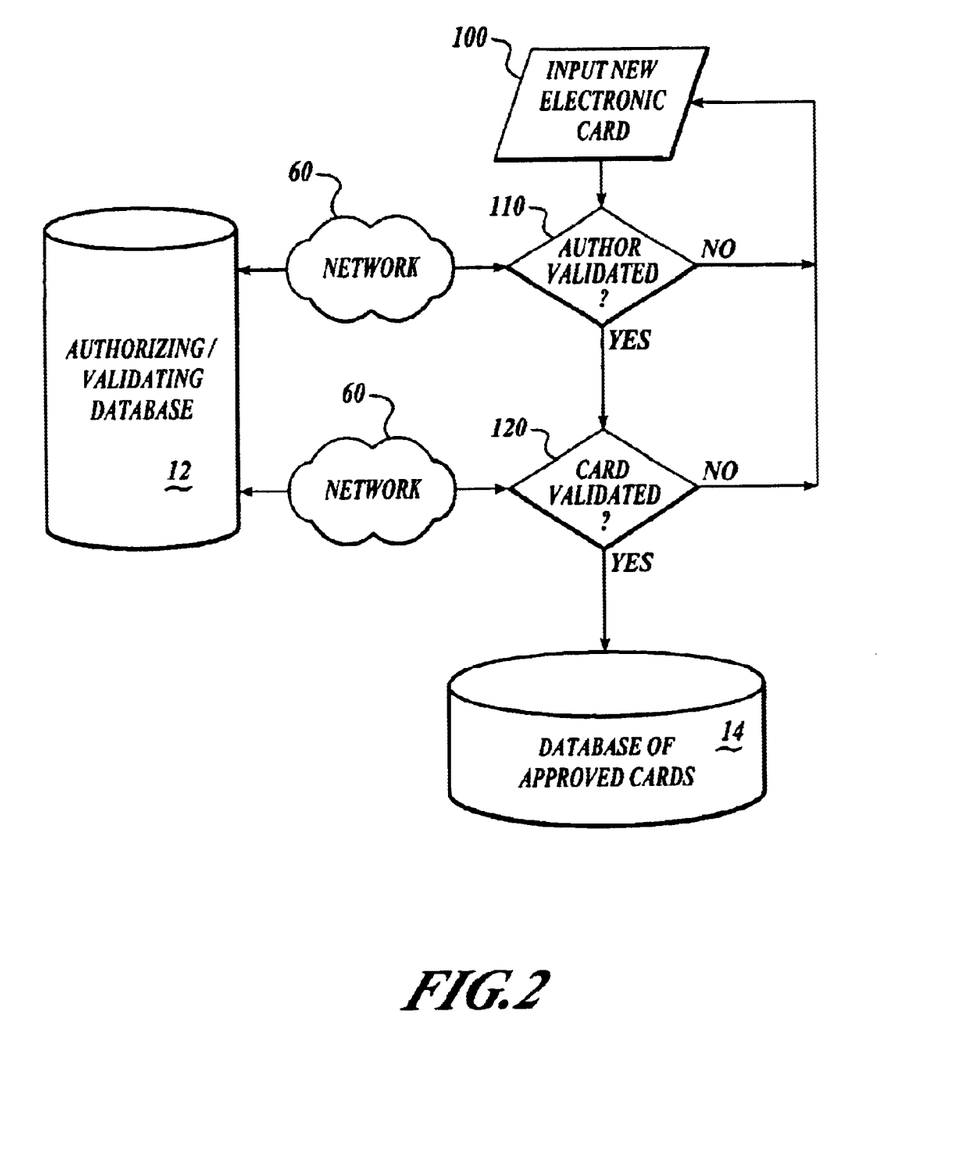
FIG. 2 is a flow diagram illustrating the electronic marking instruction card generation process of the present invention.

FIG. 2 is a flow diagram illustrating the electronic parts marking card generation entry process utilized by the system 5, FIG. 1, of the present invention.

First, at "input new electronic card" block 100, a maintenance person or other designated person enters information and instructions for the marking of a specific equipment component as an electronic parts marking card (electronic task card). At "author validation" decision block 110, the system determines whether the author is validated to save the new electronic parts marking card, or in the case of revision to a card, recording or saving the revisions to an existing card. Validation is suitably conducted utilizing a network connection 60 to an authorizing/validation database 12. The authorizing/validation database 12 maintains basic information to permit the system to determine whether a particular author or a particular electronic parts marking card may be validated. If in the "author validation" decision block 110, the author is not validated, an alternative author may be sought to input a new or revised electronic parts marking card. After validation of the author of the new or revised electronic parts marking card, at "card validation" decision block 120 the card itself is validated for form and/or substance, again utilizing information over the network 60, from the authorizing/validation database 12. If the card is not validated, an alternate entry may be made, or an alternate author may be sought to input the new or revised electronic card.

The electronic parts marking card documents the parts marking method for a specific part and permits a uniform method to publish and maintain the marking method for each component part entered into the system of the present invention. Upon author validation and card validation for the new or revised electronic parts marking card, the card is stored in the database of approved cards 14. The electronic parts marking card generated by the process of FIG. 2 is described further below in connection with FIGS. 8 and 9. In a present embodiment of the invention, the process shown in FIG. 2 is performed by the electronic card entry/revision subsystem 30 (FIG. 1).

Figure 3:
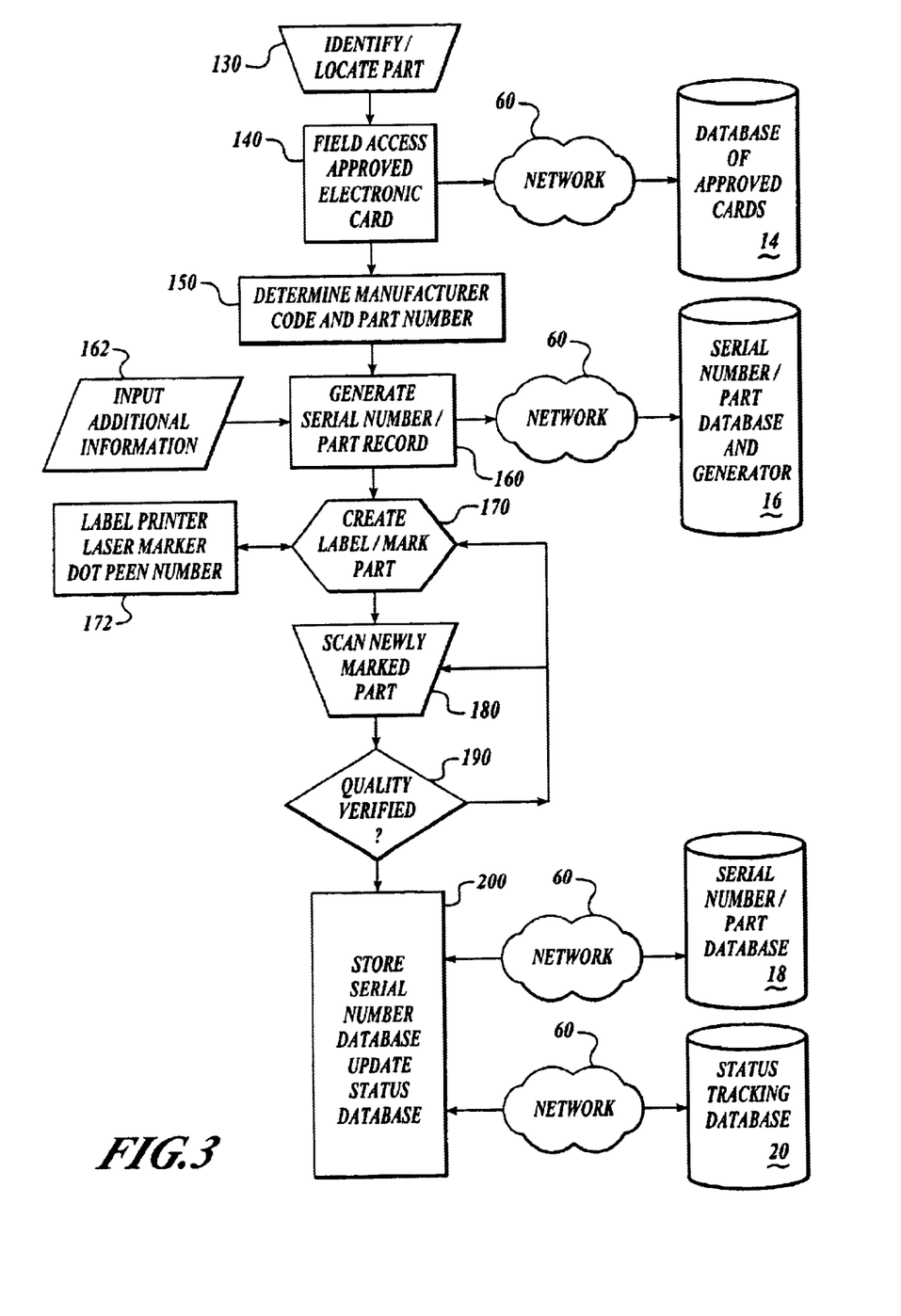
FIG. 3 is a flow diagram illustrating the parts marking and verification process of the present invention.

FIG. 3 illustrates the parts marking and verification process of the invention, performed in the present embodiment primarily by the parts marking and scanning subsystem 40 of FIG. 1. At "Identify/Locate Part" block 130, the maintenance person, or other designated person, identifies and locates the particular part to be marked. At "field access approved electronic card" block 140, that person accesses the approved electronic marking card through the computer network 60 from the database of approved cards 14. In the present invention parts marking may occur in remote locations. This access to the network may be through a wireless link to the computer network. In alternate embodiments of the present invention, part or all of the network connections are wireless, in some instances using Wireless Application Protocol (WAP).

At "Determine Manufacturer Code and Part Number" block 150, the manufacturer code and part number is determined. In a present embodiment this is done through a look-up consisting of various manufacturers' part numbers and part descriptions. Once the manufacturer code and part number for the part to be marked is determined, the system in block 160, "Generate Serial Number/Part Record," generates a unique serial number and blank part record for the part to be marked. The unique serial number itself can be formatted in compliance with any of several industry identification standards, or a system unique to the user. In a preferred embodiment, the serial number is generated via a computer network 60 by a serial number/part database generator 16.

At block 160, when the serial number and parts record is generated additional information concerning the part may be input at block 162, either automatically or by manual entry. Such information may include the location of the part, the condition of the part, its status, and, if installed, information concerning the equipment in which it is installed. After the unique serial number and part record for the part is generated, the system at block 170, "Create Label/Mark Part," creates a mark for the part, and the mark is applied to the part by the maintenance person, or other designated individual. The mark generated for the part can be a wide variety of computer readable or scanner readable marks, including linear bar codes, stencil markings, and two dimensional matrix symbols or codes. Marking systems include ATA Spec 2000 and ANSI MH10 Systems. The labels or marks themselves may be created and/or applied through non-intrusive marking methods, including labels, direct printing including ink jet printing, laser bonding, stenciling, silkscreening, or applying contact memory buttons or RFID tags. Marks can also be created and/or applied using intrusive means, including abrasive blasting, stamping, dot-peen processes, chemical etching, laser coloring/etching/ engraving, or laser induced vapor deposition. Labels, if used for marks, may include self-stick adhesive labels, or adhesive mounted and sealed labels. The mark itself may be installed on the part automatically by machine, or installed on the part by a maintenance person or other designated individual.

At block 180, "Scan Newly Marked Part," quality control of the parts marking process is verified. At block 180 the newly marked part is scanned by the operator or designated person. At decision block 190, "Quality Verified," the system analyzes whether the parts mark is verified as readable and is linked to its part record. If the part cannot be properly scanned and verified, then the part can be rescanned under block 180 "Scan Newly Marked Part." If scanning and verification continues to fail, a new part mark can be generated and the part can be re-marked under block 170, "Create Label/Mark Part." If the parts mark quality is verified, then the system proceeds to block 200, "Store Serial Number Database/Update Status Database" where the part serial number is recorded via the network 60 in the serial number/part database 18. The marking status tracking database 20 is also updated through a network 60. As the serial number/part database 18 is updated, information from that database may be transmitted directly to the status-tracking database 20, to keep it updated in real time.

Figure 4:
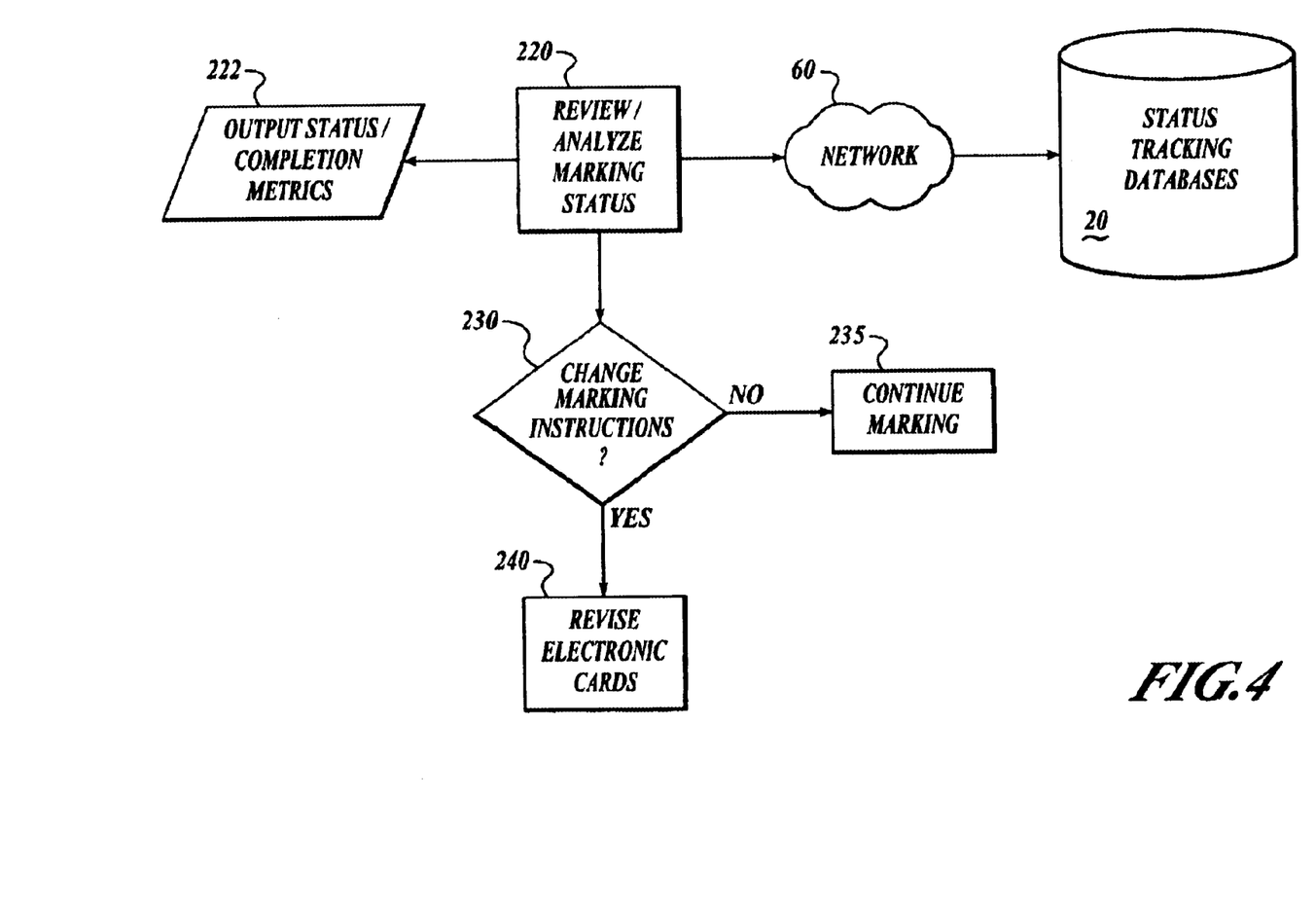
FIG. 4 is a flow diagram illustrating the parts marking status review and revision operations of the present invention.

FIG. 4 is a flow diagram that illustrates the parts marking status and management process performed by the status/management subsystem 30 (FIG. 1). At block 220, "Review/Analyze Marking Status," an operator, or a manager utilizing management and/or analysis protocols, reviews and analyzes the marking status of the marking operation. As part of that operation, status and/or completion metrics, displays or data may be generated and output under block 222, "Output Status/Completion Metrics." The review and analysis of marking status may be done remotely from the status-tracking database 20 by connections through a computer network 60. At decision block 230, "Change Marking Instructions," the review and analysis involves a decision whether to change the marking instructions and/or protocols utilized for parts marking. If marking is proceeding successfully, the system continues marking under block 235, "Continue Marking." If the system is not resulting in proper or successful marking, marking instructions may be changed under block 240, "Revise Electronic Cards," involving revising the electronic marking cards (electronic task cards).

The electronic card generation process in FIG. 2, the parts marking and verification processes of FIG. 3, and the parts marking status review and analysis processes of FIG. 4 are combined and operated by the unified but dispersed system 5 of FIG. 1. Any one or more of these subprocesses may be conducted at any given location, or any given time, by singular or multiple users. The flexibility of remote marking utilizing computer readable and computer generated marks, in connection with a uniform published parts marking system consisting of electronic parts marking cards (electronic task cards) provides great flexibility in implementing parts marking strategies. Easy remote marking permits "opportunistic parts marking" (OPM) whenever it is convenient to gain access to parts. Targeted "seek and mark" protocols can direct the marking of particular parts in rapid sequence. "Gated" strategies either mark, or require prior marking, at chosen locations in the parts distribution system. Remote operation also permits "vendor marking at source" by the parts manufacturer. Alternately, parts may be marked at the "equipment build" stage when the equipment is either assembled, or rebuilt for long standing or "legacy" systems. All of these strategies are supported by the system 5 of FIG. 1 of the present invention, utilizing the suboperations of electronic marking card generation and revision of FIG. 2, parts marking and verification of FIG. 3, and system updating and monitoring of FIG. 4.

Additional subsystems may be added in any of the given operations. For example, generating or revising electronic parts marking cards may also include further steps of querying the database of approved cards to determine whether a parts marking methodology has already been developed. Temporary lockouts may be implemented for the database of approved cards, while work is in progress on updating or generating a new or revised electronic parts marking card for the given part. Document marking methods may be reviewed and compared through test installations and test scanning, including checking for label readability and access when the part is installed. Documentation included in any given electronic parts marking card may be updated and proofed, such as with new or more complete photographs or graphic information.

In a present embodiment, the serial number for a particular part is generated at a controlled central register, which produces a unique number when the logic calls for a serial number to be generated. That present embodiment utilizes a computer based number generator linked to the serial number/part database, with computer network enabled delivery, to complete this step.

Also, in a present embodiment, a centralized website enables coordination of management of the parts operation, with information delivered over the computer network.

FIGS. 5–12 are screen shots generated by an example embodiment of the present invention. These FIGURES illustrate example input and output methods for the invention utilizing communications over a local area or wide area computer network.

Figure 5:
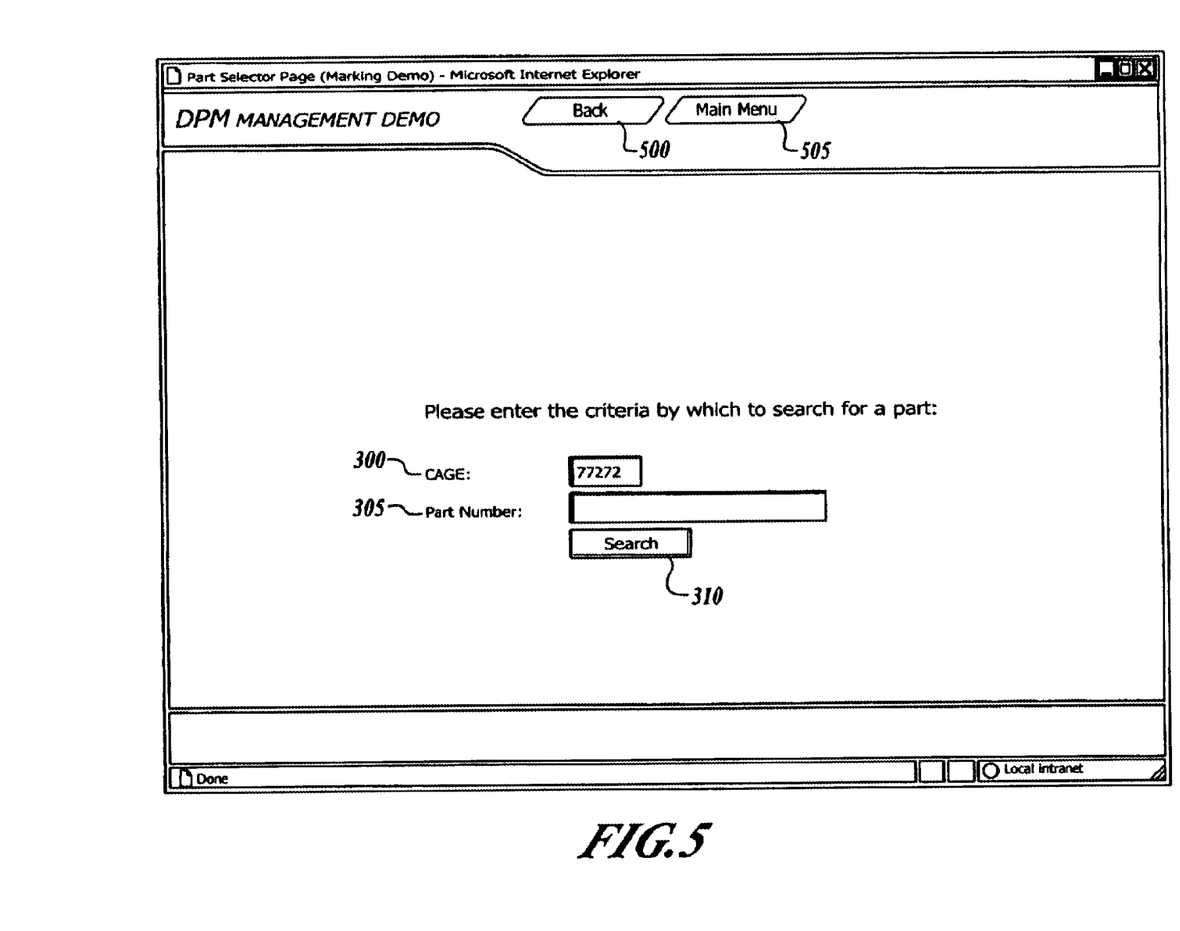
FIGS. 5 and 6 are screen shots of an example network interface tool used in the parts search process of the present invention.

FIG. 5 is a part search screen of the direct parts marking management system of the preferred embodiment. The screen in FIG. 5 permits searching for a part through entry of the manufacturer's commercial and government entity code (CAGE) which may be entered by the maintenance person or a designated person using the parts marking system through the screen of FIG. 5 at the CAGE entry location 300. The part entry section 305 also permits entry of a specific part type number. A search button 310 signals the central database to search for the requested part. General system management keys on the screen permit the user to step back to a prior screen, utilizing a back step key 500, or to jump to a menu using a main menu key 505.

Figure 6:
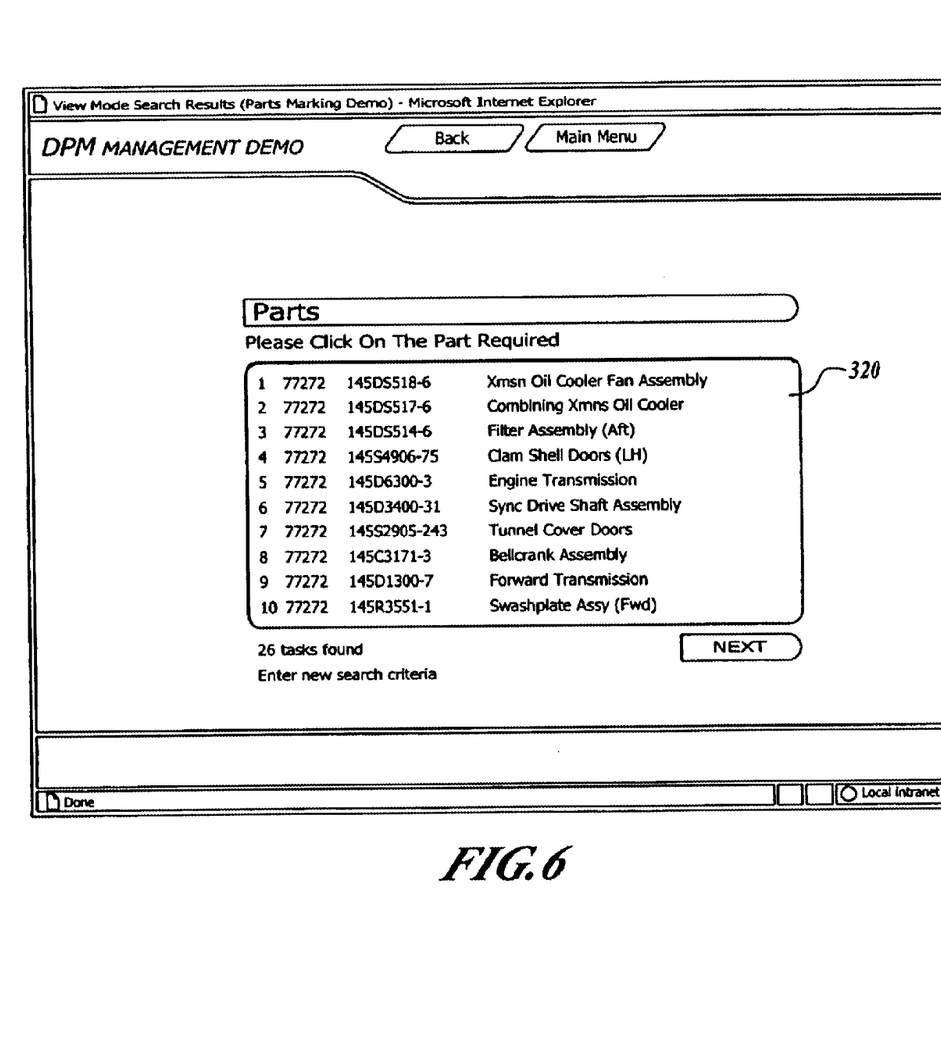

FIG. 6 is a screen shot that shows the results of a search based upon the example CAGE entry shown on FIG. 5. The database of the system has returned a list of parts registered for the particular vendor. That list 320 allows the user to click on the part being marked.

Figure 7:
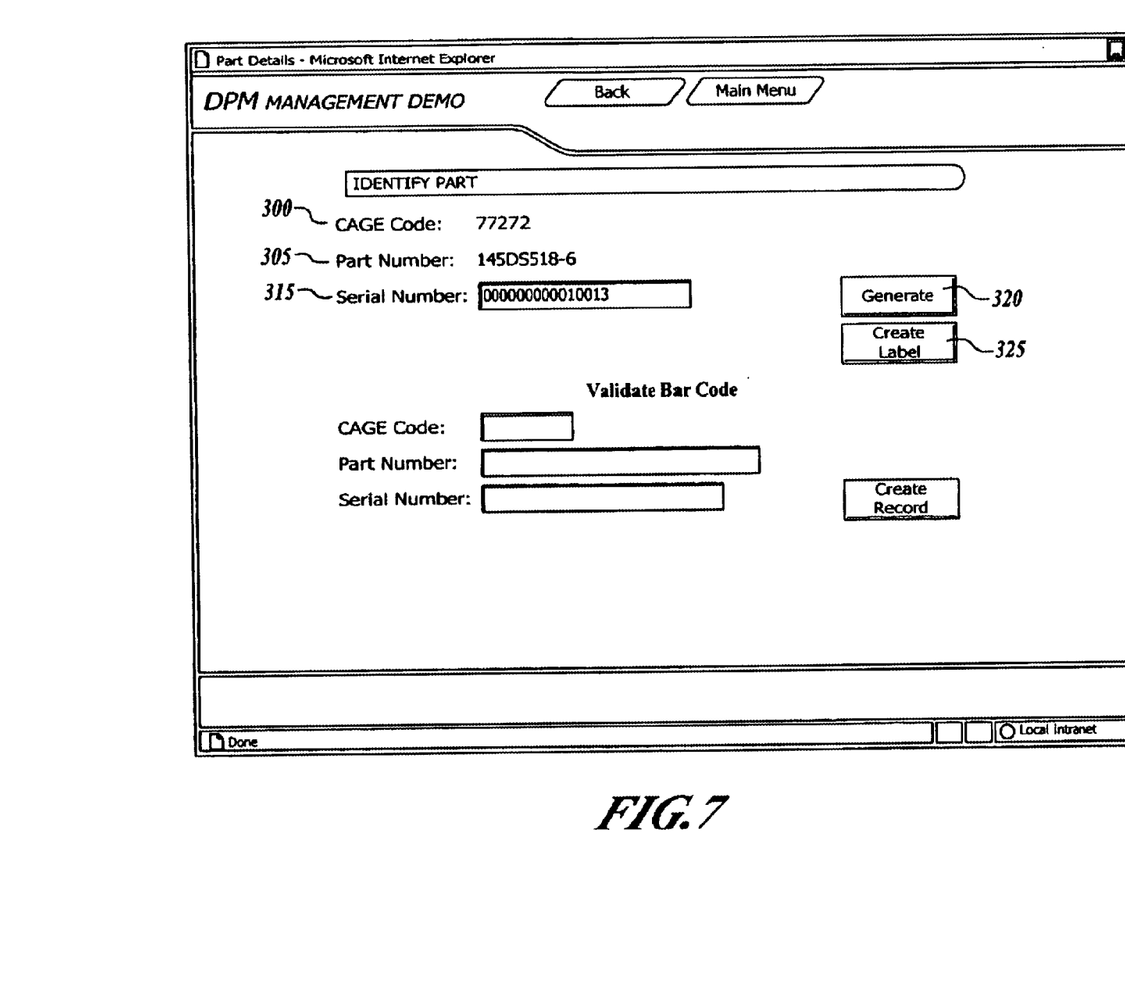
FIG. 7 is a screen shot of an example network interface tool used in the part serial number generation process of the present invention.

If the part is not already marked, FIG. 7 shows a screen shot of the part number generation and validation steps of the system. With the CAGE code 300, and the part number 305 of the part selected being displayed, a unique serial number 315 for the part to be marked is generated by selecting a generate key 320. At this point, the system, at block 160, "Generate Serial Number/Part Record," of FIG. 3 generates a serial number and a part record for the part to be marked, connecting through the network with the serial number/part record generator. Additional information may be manually input, or automatically input to the record for the specific part to be marked. After the generation of the unique serial number 315, the screen of FIG. 7 permits a mark to be generated for the part by the selection of a create label key 325. The system then generates a mark or set of labels for the part to be marked, with the marking type dependent upon the particular part being marked.

Figure 10:
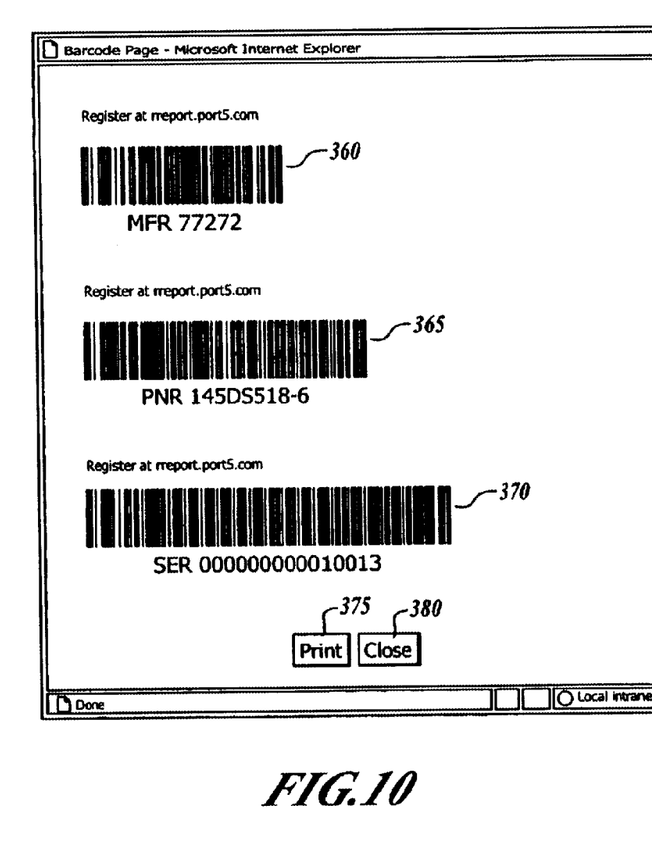
FIG. 10 is a screen shot of example bar codes generated by an example network interface tool used in the parts marking process of the present invention.

Example part labels are shown in FIG. 10, a screen shot of the label screen created by the mark creation process of the invention. For this example mark, a separate bar code is generated for the manufacturer number 360, for the part number 365, and for the unique serial number for the part being marked, bar code 370. The screen of FIG. 10, after the creation of the mark, permits the user to select the printing of the mark by selection of a print bar 375, or canceling of the mark through a close bar 380. Not shown are screens which would show two-dimensional matrix or other marks for alternative marking systems, such as dot peening or stenciling.

Figure 8:
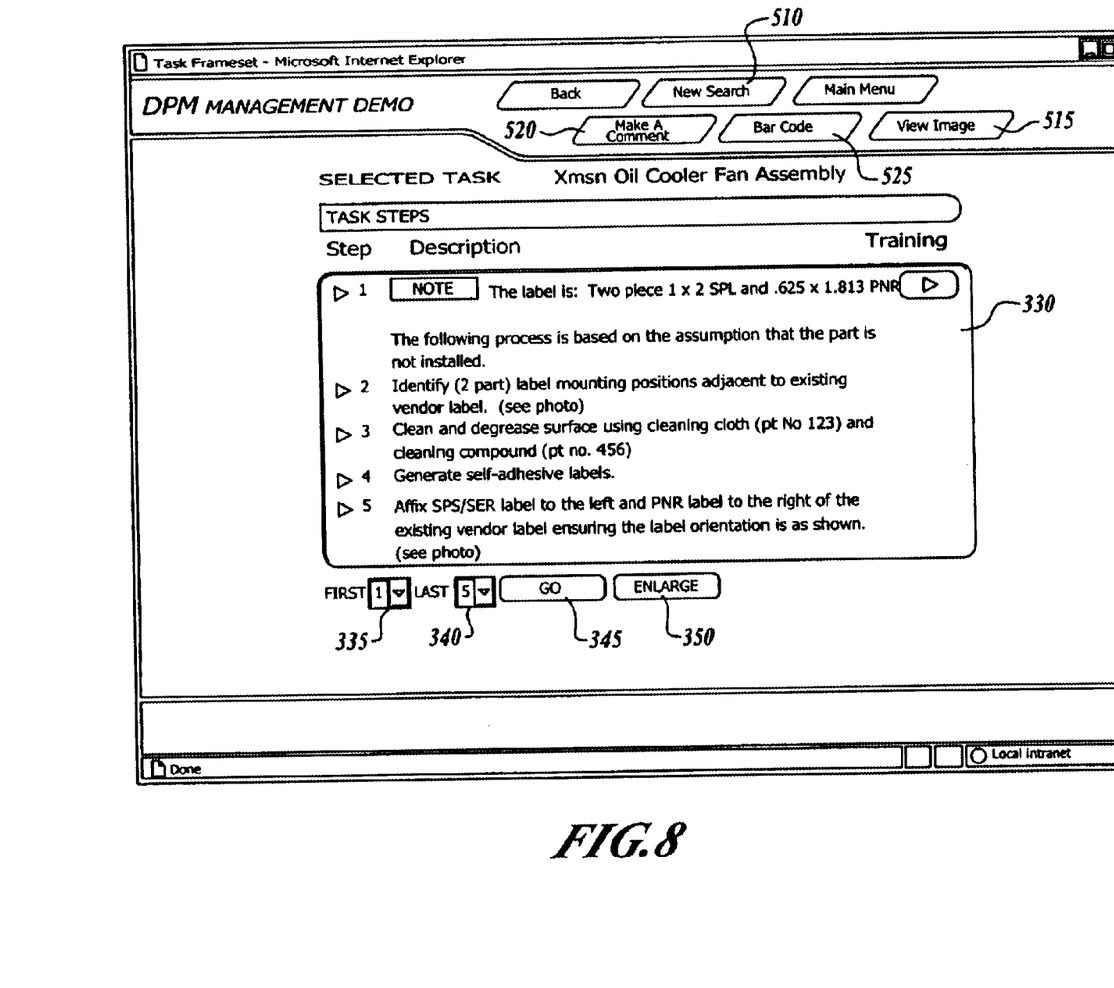
FIGS. 8 and 9 are screen shots of a two screen electronic parts marking card (electronic task card) of an example network interface tool used in the parts marking process of the present invention.
Figure 9:
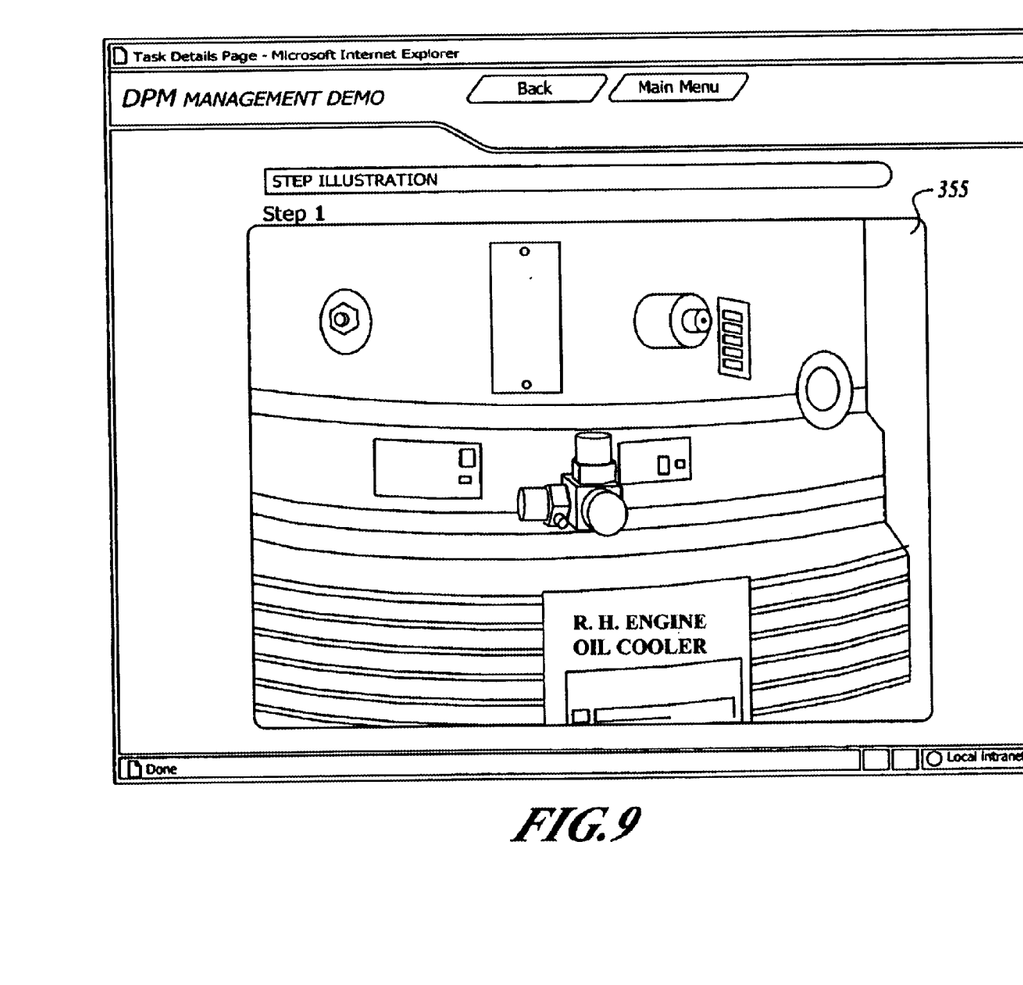

FIGS. 8 and 9 are screen shots of the electronic parts marking card (electronic task card) of the present invention that provides the user with instructions as to the specific type, placement, and application of the parts marks. The electronic parts marking card provides a step by step listing of the steps for marking the part, through an instruction list 330. The instruction list may be one or more pages. A present embodiment allows selection of first 335, and last 340 pages of the electronic task card for display. A go bar 345 permits jumping to a particular page and an enlarge bar 350 allows any portion of the card or card data to be enlarged. As shown on FIG. 9, a second screen shot of the electronic parts marking card, images may be part of the task card. In this example marking card, as shown in FIG. 9, the label positions for the parts marks are shown by presenting a marking step illustration 355, showing the marks, in this case labels, applied to the part. This step illustration 355 permits the designated user to clearly see the proper location and orientation of the label as applied to the part.

In a present embodiment, the electronic parts marking card screen, as shown on FIG. 8 allows additional alternative choices, including a new search bar 510 for a new search for a different part if the wrong part has been selected. An opportunity is permitted to comment on the usefulness of or errors in the electronic parts marking card through a "make a comment bar" 520. Bar code generation can be directly selected through a bar code button 525. An image of the part may be shown through a view image bar 515. A wide variety of data, including dimensional data, descriptive text, engineering drawings, and photographs, may be incorporated into an electronic parts marking card to properly demonstrate installation of the parts label.

Figure 11:
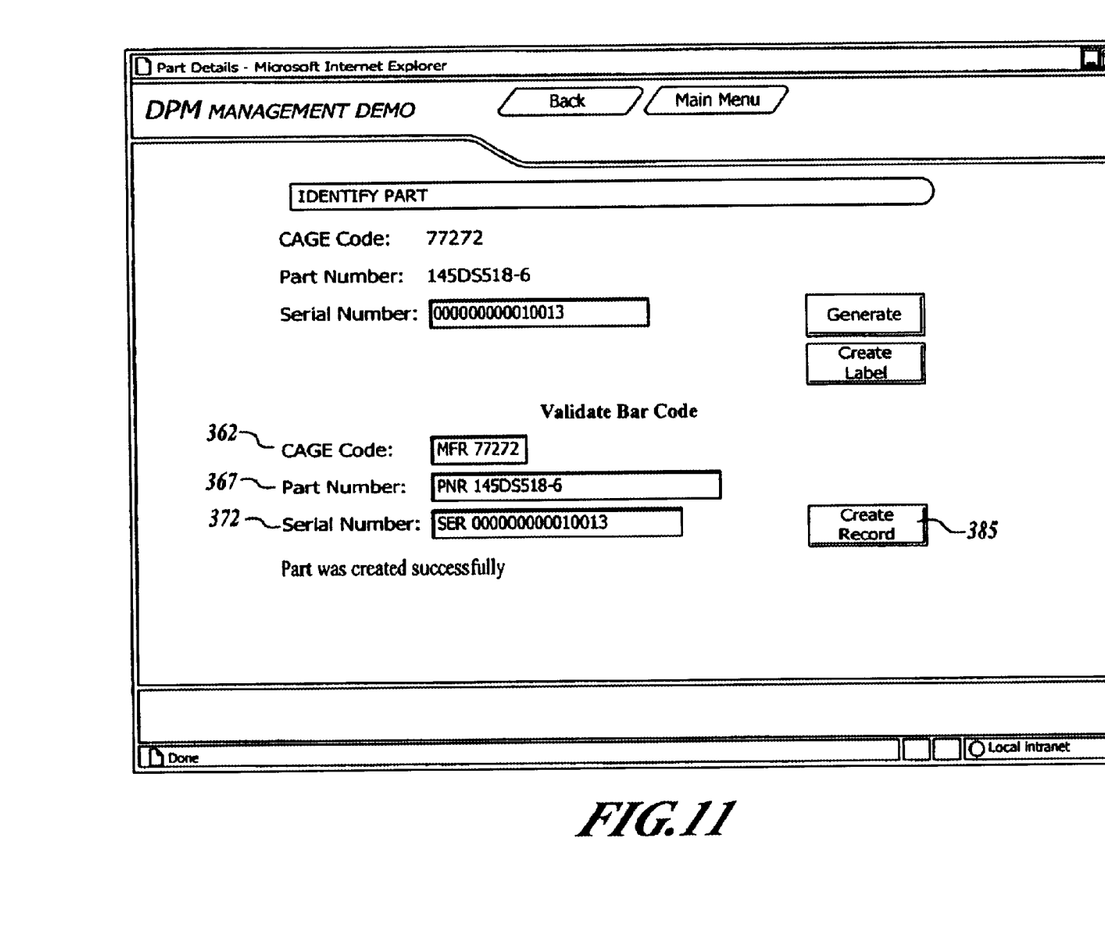
FIG. 11 is a screen shot of a parts marking validation screen produced by an example network interface tool used in the parts marking verification process of the present invention.

FIG. 11 is a screen shot of the parts marking validation screen utilized by an example system of the present invention for validating the label as attached to the part being marked. After a unique serial number for the part has been generated, and the label has been created and applied, the part label is scanned by the remote operator to confirm validity of the installed label. In this example, the CAGE code 362, the vendor part number and the serial number 372 of the example part just marked have been scanned, and all confirm proper marking. At this point, the user selects the create record bar 385 which causes the completed part record to be stored via the computer network to the serial number/part database. Accompanying updates are simultaneously made to the parts marking status tracking database, as shown at block 200, "Update Status Database" (FIG. 3).

Figure 12:
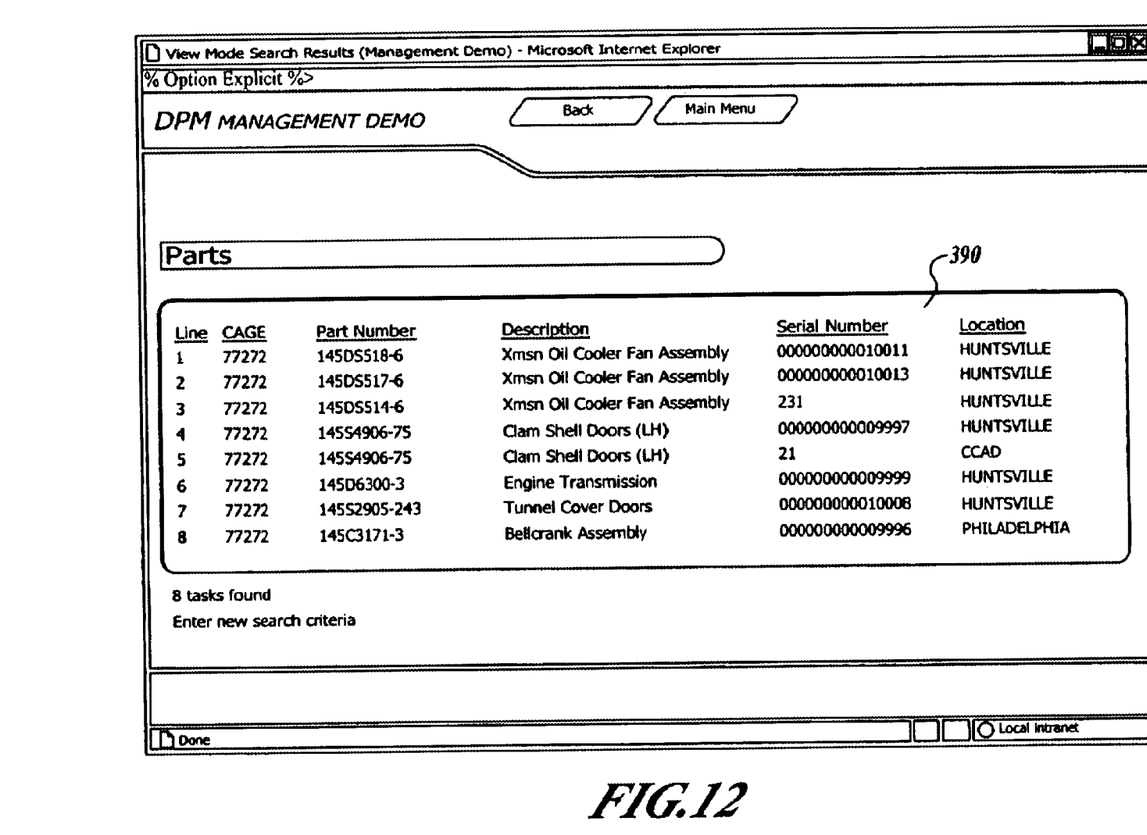
FIG. 12 is a screen shot of parts data available through an example network interface tool that performs the status review process in the present invention.

FIG. 12 is an example screen shot of the review and analysis component of the present invention. FIG. 12 shows the parts from a particular manufacturer labeled and/or marked by using the system of the present invention. This data is presented through a parts screen list 390 generated by the program implementing the system.

While the preferred embodiment of the invention has been illustrated and described, as noted above, many changes can be made without departing from the spirit and scope of the invention. For example, the system can include publishing draft marking methods for each part type. The system can include a step for review and authorization of the marking methods. It can provide for more formal publication and direct distribution of the authorized method of parts marking. Alternative mechanisms of feedback may be utilized for returning marking information and marking method difficulties or successes from the field. Various registers for part types and components may be utilized to capture further information regarding the parts being installed, their service dates and other information. A wide variety of unique serial number systems may be implemented for the marked parts, as may a wide variety of marking systems. As noted, automated and hand entered supplemental information may accompany the marking of each part, or the marking of groups and subgroups of parts. Statistical data may be gathered or generated automatically at the same time as marking, including the time required to mark each part, productivity of marking, and percentage of completion of parts marking tasks. In each case the system as described provides for systematized and efficient marking process development, authorization, publication, and implementation. Authorized marking is able to carried by multiple teams in remote locations simultaneously. Part number and serial number errors are removed by delivering unique part number and serial number configuration control processes to the remote locations, including multiple remote locations simultaneously and nearly instantaneously. The system also can track the progress of multiple marking operations simultaneously, and compare this progress against the marking plan sought to be implemented.

Marking may continue at the same time as the information is utilized for maintenance and operation planning for the equipment fleet for which the parts are being marked. In the preferred embodiment, the system is utilized for a legacy fleet of aircraft, but the system is not limited to aircraft, but may be applied to fixed and mobile systems of electronic, chemical, and/or mechanical equipment where efficiency, cost, and reliability of operation maintenance are important. Accordingly, the scope of the invention is not limited by the disclosure of the preferred embodiment. Instead, the invention should be determined entirely by reference to the claims that follow.

What is claimed is:

1. A method for marking and managing equipment parts, the method comprising:

inputting parts marking information into one or more electronic parts marking instruction cards;

accessing the electronic parts marking instruction cards;

generating a unique serial number and a part record for an equipment part;

marking the equipment part with a machine-readable mark including the unique serial number; and saving the serial number and the part record for the equipment part in a parts database.

2. The method of claim 1, further comprising validating the electronic parts marking instruction cards.

3. The method of claim 1, further comprising revising the electronic parts marking instruction cards.

4. The method of claim 1, further comprising scanning the machine-readable mark including the unique serial number.

5. The method of claim 4, further comprising validating the readability of the machine-readable mark.

6. The method of claim 1, further comprising storing additional parts related information in the part record for the equipment part.

7. The method of claim 1, further comprising connecting a computer at least one remote location utilizing a computer network.

8. The method of claim 7, wherein the computer network comprises wireless communications.

9. The method of claim 1, wherein marking the equipment part with a machine-readable mark includes at least one of applying a bar-code label, stenciling, applying a two-dimensional matrix label, laser engraving, and dot-peening.

10. The method of claim 1, further comprising analyzing status of marking and managing equipment parts using a status-tracking database.

11. The method of claim 10, further comprising outputting status and completion metrics.

12. The method of claim 11, further comprising managing at least one of parts manufacturing, transporting, storage, installation, maintenance, record keeping, operation and labeling, utilizing the status and completion metrics.

13. A computer-based apparatus for marking equipment parts, the apparatus comprising:

means for creating electronic parts marking instruction cards;

means for storing and accessing electronic parts marking instruction cards;

means for generating a unique part serial number and a part record for each part to be marked;

means for scanning a part mark;

means for producing a part mark; and means for storing and accessing the unique part serial number and parts record.

14. The apparatus of claim 13, further comprising means for validating and revising the electronic marking instruction cards.

15. The apparatus of claim 13, further comprising means for storing and accessing additional part related information in a part record.

16. The apparatus of claim 13, further comprising means for analyzing the parts record.

17. The apparatus of claim 16, further comprising means for outputting analysis and metrics compiled from analyzing the parts data.

18. The apparatus of claim 13, further comprising means for interconnecting one or more means of the apparatus utilizing a computer network.

19. The apparatus of claim 18, wherein the computer network comprises wireless communications.

20. The apparatus of claim 13, further comprising means for storing information concerning the status of parts marking.

21. A computer program product for marking and managing equipment parts comprising:

computer readable media for inputting electronics parts marking instruction cards into an electronic card database;

computer readable media for accessing an electronic card database and a parts database;

computer readable media for generating a unique serial number and a part record for each part to be marked;

computer readable media for producing a part mark; and computer readable media for saving a part record for each part to be marked in the parts database.

22. The product of claim 21, further comprising computer readable media for permitting use of a computer network to operate the product remotely.

23. The product of claim 22, further comprising computer readable media for permitting the computer network to utilize wireless communications.

24. The product of claim 21, further comprising computer readable media for validating and revising the electronic marking instruction cards.

25. The product of claim 21, further comprising computer readable media for storing and accessing additional part-related information in a part record.

26. The product of claim 21, further comprising computer readable media for analyzing the parts database.

27. The product of claim 26, further comprising computer readable media for outputting analyses and metrics produced by analyzing the parts database.

28. The product of claim 21, further comprising computer readable media for permitting the electronic card database and the parts database to be hosted on one or more central servers.

29. An electronic task card product, comprising:

an electronically stored set of written task instructions for marking equipment parts; and an electronically stored set of graphical task instructions for marking equipment parts.

30. The product of claim 29, further comprising electronically accessible links between the written instructions and graphical instructions.

* * * * *